United States Patent [19]

Limongelli et al.

[11] Patent Number: 4,800,645
[45] Date of Patent: Jan. 31, 1989

[54] MACHINING CENTER WITH MAGAZINE FOR THE TOOLS

[75] Inventors: Felice Limongelli, Samone; Favareto Marcello, Villarbasse, both of Italy

[73] Assignee: OCN-PPL S.p.A., Marcianise, Italy

[21] Appl. No.: 104,082

[22] Filed: Oct. 5, 1987

[30] Foreign Application Priority Data

Oct. 6, 1986 [IT] Italy .................. 67755 A/86

[51] Int. Cl.⁴ .................................. B23Q 3/157
[52] U.S. Cl. .......................... 29/568; 198/346.1; 198/465.1; 414/277; 414/280
[58] Field of Search ............ 29/568; 198/346.1, 465.1; 414/277, 280

[56] References Cited

U.S. PATENT DOCUMENTS

| | | | |
|---|---|---|---|
| 3,691,655 | 9/1972 | Kurimoto et al. | 29/568 |
| 4,240,194 | 12/1980 | Inami et al. | 414/277 X |
| 4,291,797 | 9/1981 | Ewertowski | 198/349 |
| 4,326,624 | 4/1982 | Ewertowski et al. | 198/465.1 X |
| 4,587,716 | 5/1986 | Bytow | 29/568 |
| 4,625,387 | 12/1986 | Stoilov | 29/568 |
| 4,654,957 | 4/1987 | Powell et al. | 29/568 |

*Primary Examiner*—Gil Weidenfeld
*Assistant Examiner*—Steven C. Bishop
*Attorney, Agent, or Firm*—Banner, Birch, McKie & Beckett

[57] ABSTRACT

The mechanical machining center is associated with a magazine for the tools in which the tools are collected in two horizontal rows superposed on vertical frames (pallets) transportable by means of a rotatable handling device from the magazine to a position in which an exchange arm withdraws the tools and brings them to the spindle of the working head. The magazine is composed of a fixed structure with a variable number of modules disposed in the form of a fan around the rotatable handling device and in which the pallets complete with tools are accommodated. The pallets may be transported manually or with the aid of wire-guided trolleys from a central magazine to each module. The handling device comprises a rotatable carousel structure on which two cage-like frames for supporting the pallets are pivoted in diametrically opposed position.

Normally, one of the two frames is in a loading position, while the other frame is in an exchange position close to the exchanger arm. The frame in the loading position can rotate on the structure of the handling device to align itself with each module of the magazine. Each cage-like frame is provided with a chain-type loading device for withdrawing a pallet of tools from the magazine of for carrying a pallet of used tools back to the magzazine. In exchanging position each frame is movable to bring the desired tool into correspondence with the exchange arm.

19 Claims, 4 Drawing Sheets

MACHINING CENTER WITH MAGAZINE FOR THE TOOLS

BACKGROUND OF THE INVENTION

The present invention relates to a machining centre with a modular magazine for the tools.

The problems of the handling of the tools in the magazines of modern machining centres have been faced for many years and each of the solutions offered suits the special requirements and configurations of the particular machining centre with which it is associated.

For example, a magazine for the tools of the "chain" type is known in which the tools are supported by carriages connected to one another and caused to slide on guides in the proximity of a movable arm which effects exchange between a used tool extracted from the spindle of the machining centre and a fresh tool withdrawn from the chain.

This type of tool magazine is generally cumbersome and not very flexible, inasmuch as it does not allow a capacity for easy expansion or conversions of the magazine to follow the development of the complexity of the working machine and of its machining operations. Moreover, this magazine does not permit rapid reconfiguration of the tools for new machining operations and it is not possible to utilize it for serving a plurality of working machines.

In another type of magazine for machining centres, the tools are disposed in two parallel rows on a plurality of horizontal supporting frames aligned one beside the other on horizontal supporting beams. A carriage provided with a motorized arm and controlled by a computer slides beside the frames to withdraw and/or deposit the tools. The carriage shifts from the magazine to a position beside the working machine, where an exchanging fixture carries out exchange of the tools between the spindle and the motorized arm. This type of magazine occupies a large area close to the machine, because of which an eventual extension thereof proves difficult. In view of the horizontal position of the frames, their transport requires considerable free space, with considerable increase in the general costs of the centre. Moreover, the reconfiguration of the tools can be done only manually, with considerable loss of time.

SUMMARY OF THE INVENTION

The technical problem of the present invention is to produce a machnining centre with a tool magazine which is very flexible, can be easily expanded even at times subsequent to installation and such as to permit handling of the tools in a completely automatic manner both betwen the magazine and machine and between different magazines.

Another aspect of the invention is to produce a tool magazine which allows the fullest accessibility of the tools and the changing of single tools or the substitution of groups of tools to be effected automatically.

This technical problem is solved by the machining centre and tool magazine according to the present invention, comprising a plurality of supporting structures for a group of tools and a plurality of fixed cradles adapted to contain the supporting structures removably, the cradles being disposed one beside the other in the form of a fan along a circular arc adjacent one side of the working machine. These characteristics of the invention will appear more clearly from the following description of a preferred embodiment given by way of example, but non-limitatively, and from the accompanying drawings.

DETAILED DESCRIPTION OF THE PREFERRED EMBODIMENT

Figure 1:
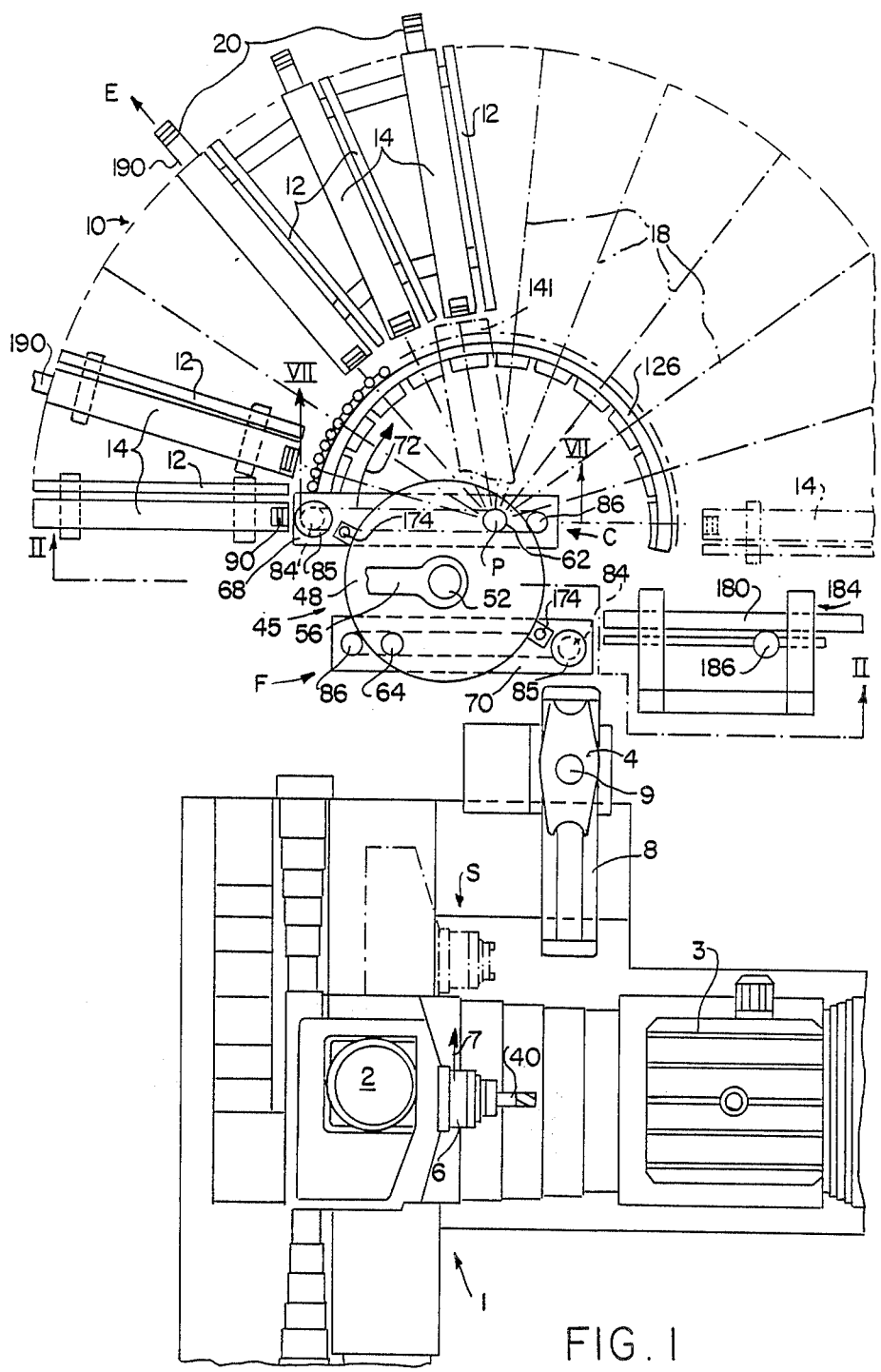
FIG. 1 is a plan view of a machining centre associated with a tool magazine according to the invention.

Referring to FIG. 1, the machining centre comprises a machine tool 1 having a working head 2, a worktable 3 and an exchanger arm 4 for the tools 40 which are mounted on the spindle 6 of the head 2. In order to effect the substitution of a tool, the head 2 shifts in the direction of the arrow 7 to bring the spindle 6 into a position S, in which the arm 4 extracts the used tool from the spindle 6 and, after a rotation of 180°, deposits a fresh tool in the spindle.

Through the medium of a translation on a guide 8 and a rotation about an axis 9, the arm 4 then deposits the used tool 40 in a location in a magazine indicated generally by the reference 10.

The magazine 10 for the tools is positioned beside the machine 1 and comprises a series of fixed cradles 12, each adapted to contain and guide a structure 14, hereinafter called a "pallet", for supporting the tools 40. The cradles 12, which are all alike, are arranged in fan or rack fashion and mutually equidistant along a circular arc which may extend up to 180°.

Each cradle 12 constitutes a modular element or module of the magazine, for which reason the magazine 10 can be constructed by degrees, installing first of all a small number of modules 12, and then, according to needs, it can be supplemented by adding other modules 12. The modular elements 12 may be installed singly or in groups. Each group may comprise, for example, three interconnected modules, as indicated by the reference 20 in FIG. 1.

A modular element 12 (FIG. 2) is formed by two vertical posts 22 connected by two horizontal crosspieces 24, which also serve as guides for the sliding of the respective pallet 14 and its support in a vertical position. Each pallet 14 (FIG. 3) is formed by two horizontal bars 26, 27 connected by two uprights 30, 31. Between the uprights 30, 31 there are disposed two crosspieces 33, 34 parallel to the bars 26, 27 and bearing wheels 36 for sliding on the guides 24.

On each of the bars 26, 27 there are received, for example, seven suspension seats 38 of known type, within which the tools 40 are held.

In a substantially central position with respect to the rack-type magazine 10 (FIGS. 1 and 2) there is located a handling device 45 used for selecting the pallets 14 in the magazine and for transferring the pallets 14 from the magazine 10 to the exchanger arm 4 and vice versa. The handling device 45 (FIG. 2) comprises a pair of discs 48 and 50 keyed on a vertical shaft 52 rotatable in a bottom base 54 and in a fixed top arm 56 fast with the base 54. The discs 48 and 50 are rotated through 180° in both directions by a hydraulic motor 58 by means of a pinion 59 meshing with a toothed wheel 60 keyed on the shaft 52.

On the two discs 48 and 50 there are fixed two pairs of pins 62, 62' and 64, 64', respectively, disposed eccentrically and opposed with respect to the shaft 52. The pins 62 and 62' are coaxial with each other, as are also the pins 64 and 64'. The shaft 52 of the discs 48 and 50 is positioned relative to the magazine 10 in such manner that the path of the axis of the pins 62 and 64 during the rotation of the discs 48 and 50 passes through the axis of the magazine 10 represented in FIG. 1 by the point P, at which the axes 18 of the pallets 14 meet.

Two cage-like supports 68 and 70, which are alike and hereinafter called simply "cage", are pivoted on the pins 62 and 64, respectively. Each cage 68 or 70 comprises a vertical frame structure formed by two arms 76, 78 (FIG. 2) which are parallel and connected by uprights 79. Two guides 81 which are parallel and in positions corresponding to the guides 24 of the module 12 are fixed to the uprights 79 for enabling the pallet 14 to be transferred to the cage 68, as will be described hereinafter.

Normally, the discs 48 and 50 are locked in the position shown in FIG. 1, in which the axis of one or the other of the two pairs of pins 62 and 64, for example the pins 62, 62', is aligned with the point P. In this position, the cage 68 is in a position C called the loading position and the cage 70 is in a position F called the exchange position. By a 180° rotation of the discs 48 and 50, the two cages are interchanged.

In the position C, the cage 68 or 70 can be made to rotate on the discs 48 and 50 by means of a suitable motor 80 (FIG. 2) in the direction of the arrow 72 (FIG. 1) to position itself in front of the pallets 14 in perfect alignment with each of them, as shown in chain-dotted lines at 141. In this way, each pallet 14 can be selected, for example through recognition codes, by rotating the cage 68 about the pins 62.

A particular recognition code for the pallets may be represented by the combination of the heights of four cams 41, 42, 43, 44 (FIG. 3) mounted on a support 45 fixed to the bar 27 of each pallet. The cams 41–44 are tested by as many sensors 46 (FIG. 2) mounted on a bracket 47 fixed to the upright 79 of each of the cages 68 and 70. By way of example, in FIG. 3 the cams 41 and 43 are "high" and the cams 42 and 44 are "low", for which reason the binary code represented is 1010.

After selection, a pallet 14 is engaged and drawn onto the cage 68 or 70 by means of a chain drawing device 74 mounted on the upper arm 76 (FIG. 2) of each of the cages 68, 70. The drawing device 74 (FIG. 4) comprises a chain 82 passed around two rotatable pulleys 84 and 86 at the ends of the upper arm 76 of the cages 68 and 70. The pulley 84 is a driving pulley and is connected to a hydraulic motor 85 fixed on the top of the arm 76, while the chain 82 is disposed below the arm 76. Fixed to the chain 82 is a downwardly projecting pin 88 (FIG. 2), which, during the movement of the chain 82, engages in a guide 90 (FIG. 4) at right angles to the rectilinear strands 82a and 82b of the chain 82. The guide 90 is formed in a block 92 fast with the top part of each pallet 14.

The pallets 14 are normally held locked in the magazine 10 by a latch (not shown) which engages a hook 190 on the pallet. This latch is removed automatically or manually to release the pallet 14 from the seat 12. The pallets 14 are positioned in such manner that, when the pin 88 turns around the pulley 84 counterclockwise, it engages in the guide 90, which is in the position indicated in dotted lines in FIG. 4, prearranging itself for the ensuing drawing of the pallet 14 onto the guides 81 of the cage 68 or 70. After the chain 82 has transported the pin 88 until it is in correspondence with the pulley 86, along the strand 82a, the pallet 14 is fully introduced into the cage 68. With a following movement of the chain 82 in the same direction, the pin 88 turns counterclockwise around the pulley 86, as indicated by a chain-dotted line in FIG. 4, and actuates a latch device 94 for locking the pallet 14 on the cage 68 or 70.

Figure 4:
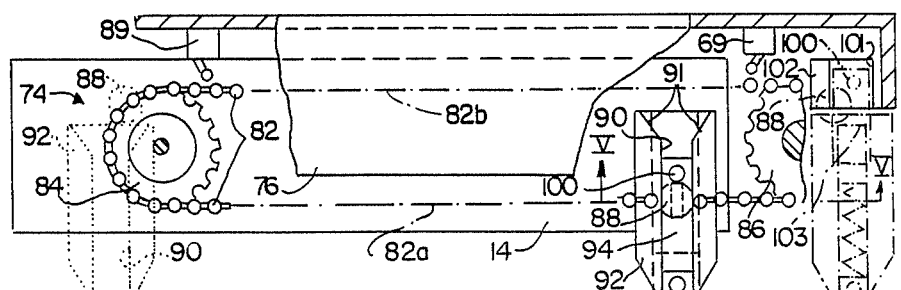
FIG. 4 is a plan view of a transport device of the structure of FIG. 3 in a working position.
Figure 5:
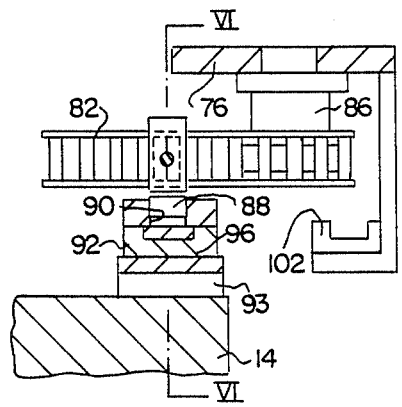
FIG. 5 is a section on the line V—V in FIG. 4.
Figure 6:
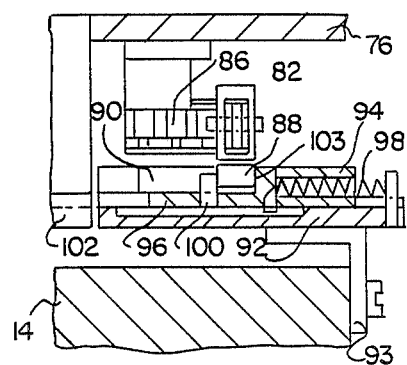
FIG. 6 is a section on the line VI—VI in FIG. 5.

The latch device 94 is contained in the block 92 (FIGS. 5 and 6) fixed to the pallet by means of a right-angled bracket 93 and comprises a slide 96 slidable below the guide 90 parallel thereto. The slide 96 is provided with a shoulder 103 and with a stud 100 between which the pin 88 can engage. A spring 98 normally keeps the slide 96 shifted towards the left in FIG. 6, so as to bring the stud 100 outside the guide 90. This is provided with a flared portion 91 which allows the pin 88 to insert itself between the shoulder 103 and the stud 100. When the pin 88 (FIG. 4) turns counterclockwise around the pulley 86, the slide 96 is moved positively towards the left in FIG. 6 by the pin 88 by means of the stud 100 until it engages in a groove 101 in a block 102 fast with the cage 68, 70 (FIGS. 4 and 5). Continuing the movement, the pin 88 emerges from the guide 90 (chain-dotted line in FIG. 4), passing between the stud 100 and the flared portion 91 of the guide 90, and actuates a switch 69 for stopping the motor 85.

The slide 96 is kept connected to the block 102 by the spring 98 compressed between the block 92 and an abutment of the slide 96.

To release the pallet 14 from the cage 68 or 70 and push it into one of the modules 12, it is sufficient to reverse the direction of the movement of the chain 82, so that the pin 88 may enter the guide 90, passing between the flared portion 91 and the stud 100. Acting against the shoulder 103, the pin 88 then pushes the slide 96 positively into the position of FIG. 6, overcoming the action of the spring 98. When the pin 88 comes to be located alongside the pulley 84 in the position indicated by a broken line in FIG. 4, it leaves the guide 90, thus releasing the pallet 14 from the cage 68, 70. The clockwise rotation of the pulley 84 ceases when the pin 88 actuates a second stop switch 89 for the motor 85.

When the cage 68, 70 is in the loading position C in FIG. 1, the lower pin 62', 64' (FIGS. 2 and 7), rotatable on the disc 50, is connected through the medium of a front coupling 110 to a shaft 112 rotatable on the base 54 and coaxial with the pin 62', 64'. The coupling 110 comprises a prismatic element 113 integral with the shaft 112 and slidable in a guide 114 at right angles to the pin 62', 64' and formed in a block 114' integral with the pin itself.

The shaft 112 is fast with a pull arm 116 used to rotate the cage 68, 70 about the pin 62, 64 towards one of the positions 141 (FIG. 1) in front of the modules 12 of the magazine 10. The arm 116 is driven by the motor 80 (FIG. 7) by means of a pinion 120 meshing with a chain 122 passed around the outside of a guide 126 fast with the base 54. The guide 126 is circular and concentric with the axis of the shaft 112. Therefore, when the arms 116 (FIG. 2) is rotated about the shaft 112 by the motor 80, the cage 68, 70 is also rotated on the pins 62, 64 and 62', 64' by means of the coupling 110.

One end 178 (FIG. 7) of the arm 78 bears on a pillar 130 fast with the arm 116 and provided with a roller 131 rolling on the guide 126 in order to unload the weight of the cage 68, 70 and the respective pallet onto the base 54. Two pads 132, one on the pillar and one on the end 178 are provided for facilitating superposition of the end 178 on the pillar 130.

For arresting and positioning the cage 68, 70 exactly in one of the positions 141 (FIG. 1), there is employed a hydraulic positioning device 136 (FIG. 7) which pushes a roller 138 into notches 140 distributed uniformly in the guide 126. The hydraulic positioning device 136 is fixed to the arm 116 and comprises a rod 142 (FIG. 8) moved axially by a plunger 144 slidable in a cylinder 145. The rod 142 extends into a chamber 146 filled with oil under pressure for control of the motor 80. The rod portion 148 inside the chamber 146 has an undercut 149 which, by moving the rod 142, opens or closes the passage between the chamber 146 and a duct 150 for feeding the motor 80. The rod 142 is slidable in a support 152 for the roller 138 in opposition to the action of a spring 154 which is kept compressed between a collar 156 of the rod 142 and the support 152.

Figure 7:
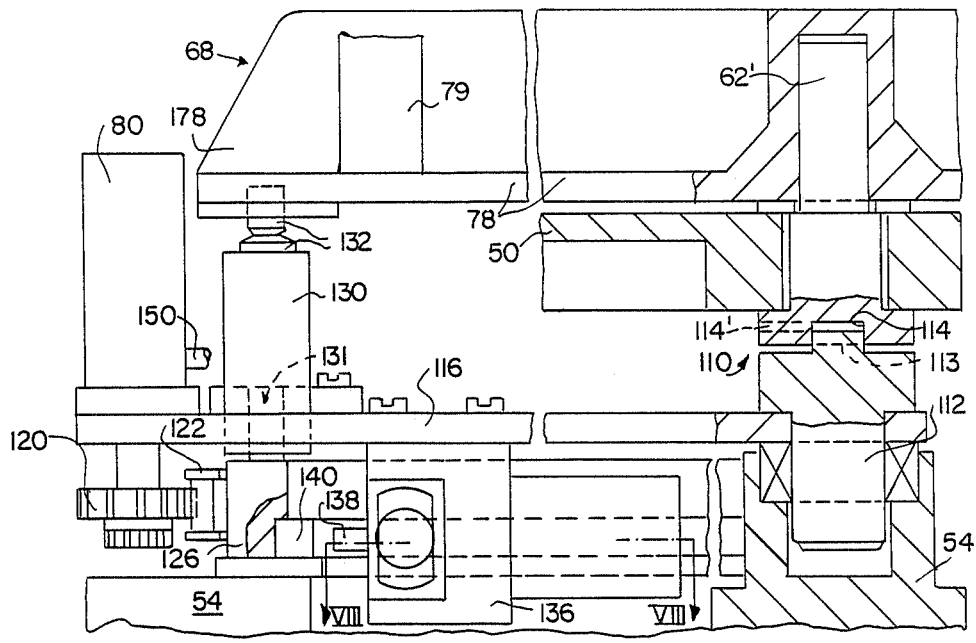
FIG. 7 is a partial section on the line VII—VII in FIG. 1 on a larger scale.

The plunger 144 is actuated by oil under pressure delivered selectively into one of the two chambers of the cylinder 145 through the ducts 155 and 157. When the rod 142 is shifted upwardly in FIG. 8, the undercut 149 allows the flow of the oil towards the motor 80, which shifts the cage 68, 70 along the rack 122 (FIG. 7). In order to lock the arm 116 and the cage 68, 70 in one of the positions 141 (FIG. 1), oil under pressure is delivered into the duct 155 (FIG. 8) to shift the rod 142 downwardly. The duct 150 is isolated from the chamber 146 and the motor 80 therefore stops. The collar 156 compresses the spring 154 against the support 152 and, as soon as the roller 138 is facing a notch 140, it snaps into it, locking the cage 68, 70 in that position.

The positioning device 136 is pivoted on two pivots 258 of an annular support 158 connected in turn to a bracket 159 borne by the arm 116 (FIGS. 8, 9), and is maintained in a stable position (FIG. 8) by two spring shock absorbers 160 for deadening the recoil movements of arrest.

Figure 8:
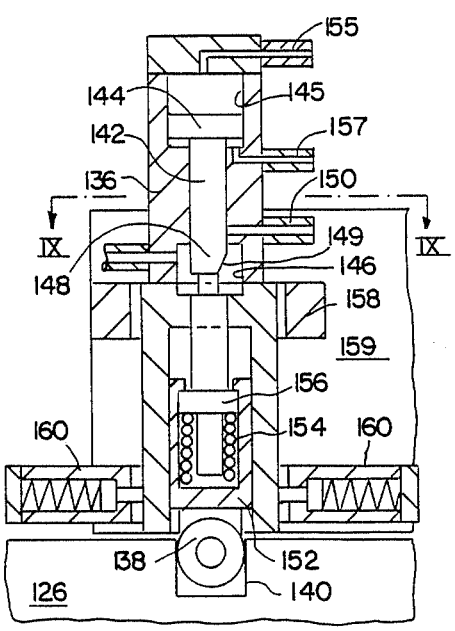
FIG. 8 is a section on the line VIII—VIII in FIG. 7.
Figure 9:
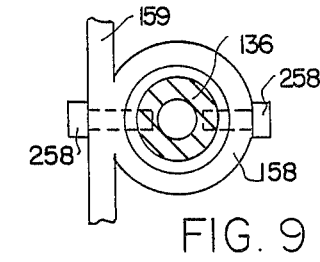
FIG. 9 is a section on the line IX—IX in FIG. 8.

To shift the cage 68, 70 again to another pallet position, oil under pressure is fed through the duct 157 (FIG. 8). In this way, the plunger 144 lifts the rod 142, which moves the roller 138 away from the notch 140. The undercut 149 puts the pressure oil chamber 146 in communication with the duct 150, whereby the motor 80 is set in motion.

Figure 2:
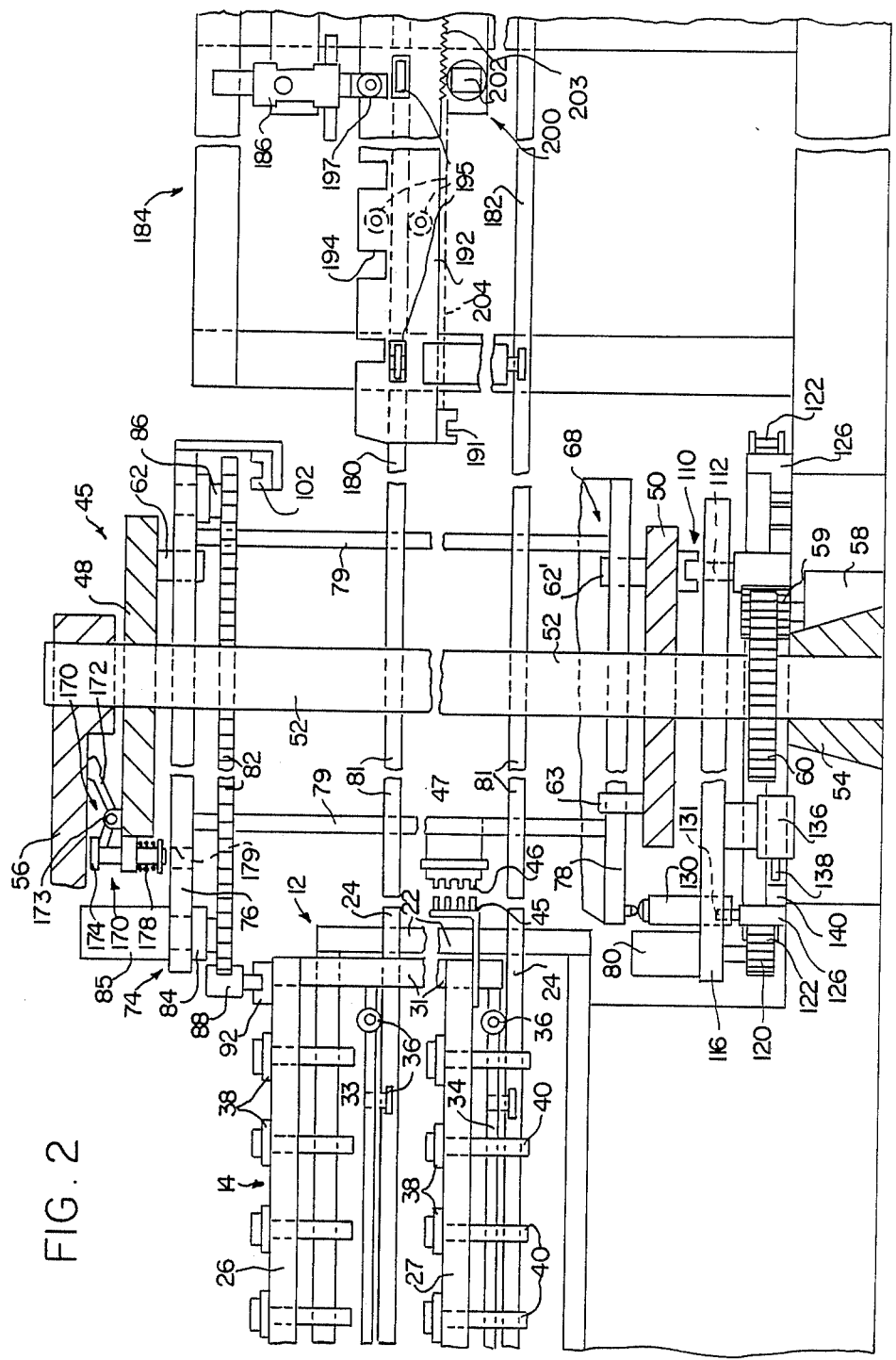
FIG. 2 is a view in partial section on a larger scale along the line II—II in FIG. 1.
Figure 3:
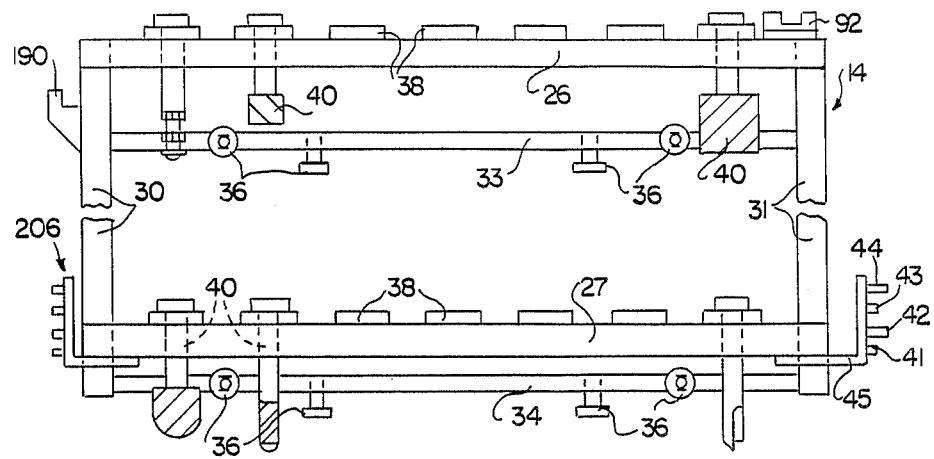
FIG. 3 is a side view of a supporting structure for the tools.
Figure 10:
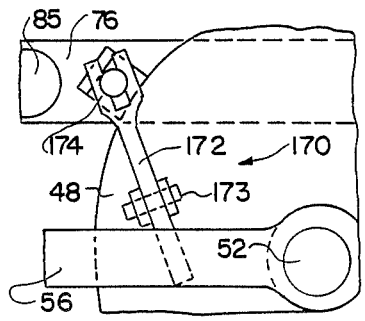
FIG. 10 is a plan view of a detail of FIG. 2.

After a pallet 14 loaded with fresh tools has been transferred from a general position 141 (FIG. 1) in the magazine 10 to the cage 68, 70, the latter is brought back to the position C by the motor 80. At this point, the discs 48 and 50 are caused to rotate clockwise through 180° into order to interchange the positions of the two cages 68 and 70. So that during the rotation of the discs 48 and 50 the element 113 of the coupling 110 (FIG. 7) may be able to disengage itself from the guide 114, it is necessary that the longitudinal axis of the guide 114 be tangent to the path of the axis of the pin 62', 64' in rotation about the shaft 52. More particularly, in FIG. 1, the element 113 and the guide 114 are disposed perpendicularly to the line joining the axis of the shaft 52 to the point P, wherefore they are shown in FIG. 7 in section in the diametral plane. In order to render the two cages 68 and 70 fast with the discs 48 and 50 during their rotation, two identical locking devices 170 are used, only one of which is shown in FIG. 2, these devices being mounted on the top face of the disc 48. A rocking lever 172 (FIGS. 2 and 10) is pivoted at 173 on the disc 48 and is adapted to lift a latch 174 extending through a drilled projection 176 of the disc 48. When the cage 68, 70 is in the position C in FIG. 1, the lever 172 is rotated clockwise by the fixed crosspiece 56 and keeps the latch 174 raised. As soon as the discs 48 and 50 rotate clockwise, they carry the cage 68 or 70 along in the same direction for a certain travel by means of a pin 63 (FIG. 2) until the lever 172 (FIGS. 2 and 10) is released from engagement with the crosspiece 56. The latch 174 is then pushed by a spring 178 into a hole 179 in the upper crosspiece 76 of the cage 68, 70, thus connecting it to the disc 48.

After effecting interchange between the cages 68 and 70, the pallet 14, contained in the cage 68, 70 now in the position F in FIG. 1, is withdrawn to the right in FIG. 2 to bring the tools into the operating zone of the exchanger arm 4 by operating the chain 82 in the direction opposite to that seen hereinbefore. The pallet 14 is then released from the lock 102 (FIGS. 4 and 5) and moved out of the cage 68, 70 along the guides 180 and 182 of an auxiliary support 184 (FIGS. 1 and 2) which is fixed and aligned with the cage 68, 70 in the position F, which constitutes the tool changing station between the selected pallet 14 and the spindle 6.

The pallet 14 is connected by means of a hook 190 (FIG. 3) with a notch 191 carried by a bar 192 (FIG. 2) slidable on the guides 180 and 182 by means of rollers 195. The bar 192 is provided with notches 194 inside which a roller 197 of a positioning device 186 is positioned. The positioning device 186 is similar to the device 136 (FIG. 8) and is used to lock the pallet 14 in the positions defined by the notches 194 corresponding to the seats 38 where the arm 4 (FIG. 1) withdraws (or deposits) a tool.

Selection of the tools on the pallet 14 is made by means of a linear position detector 200 of known type comprising an optical or magnetic sensor 202 for detecting equidistant notches 203 along the bottom face 204 of the bar 192. The detector 200, connected to a conventional control circuit not shown in the drawings, enables the positioning device 186 to be actuated when a predetermined tool seat 38 of the pallet 14 is in correspondence with the exchanger arm 4 (FIG. 1).

From what has been seen hereinbefore, it is clear that the chain 82 serves both to withdraw the pallet 14 from the magazine 10 and insert it therein, and to position the pallet 14 selectively so as to bring the tool into correspondence with the exchanger arm 4. The motor 85 is therefore operated for a prefixed travel or distance controlled by the switches 69 and 89 in the first case and through the agency of the position detector 200 in the second case.

The vertical arrangement of the pallets 14 in the magazine 10 and the rack configuration of the magazine itself enable the area required for the machining centre to be considerably reduced. Moreover, the pallets 14 can be easily transported even in small spaces.

The presence of the two cages 68, 70 on the handling device 45 (FIG. 1) considerably increases the flexibility of use of the rack-type magazine according to the invention. In fact, while the exchanger arm 4 withdraws and/or deposits the tools on the pallet placed, for example, in the cage 68 in position F, the cage 70 which is in position C can be operated to deposit another pallet in, and/or withdraw it from, the magazine 10 and hold it ready to transfer it to position F.

Normally, the pallets 14 are loaded with the tools in a suitable room for distributing the tools, called the "tool room", and from here are transported manually, or by automatically guided trolleys, to be inserted in the magazine 10 from the outside E (FIG. 1). Moreover, at any moment and without impeding the machining operations in progress, the pallets contained in the magazine 10 can be withdrawn from the outside E after releasing the hook 190 and be transported manually or automatically with wire-guided trolleys to the magazines of other machining centres. Recognition of the pallets 14 is achieved with suitable identification codes obtained by means of cams 206 (FIG. 3) read by a suitable reader carried by the trolley and which are similar to the cams 41–44 previously described and fixed to each pallet 14 on the upright 30 facing towards the outside of the magazine.

According to a modified form of the invention, in order to increase flexibility and reduce the times for the distribution of the tools, the handling device 45 may contain four cages disposed on the discs 48 and 50 at 90° one from the other.

Moreover, this device can translate on suitable guides not shown in the drawings to move away from the magazine 10 into a position suitable for also serving a second machining centre.

It is understood that modifications, additions or substitutions of parts may be made in the machining centre with a magazine for the tools which has just been described without, however, departing from the scope of the invention.

We claim:

1. Machining center with a magazine for a plurality of tool supporting structures each containing a group of working tools, said center having a tool changing device located between a tool changing station and a working machine, said magazine comprising a handling device adapted to exchange a first structure withdrawn from said magazine with a second structure disposed at said station, said handling device comprising a pair of discs keyed on a vertical shaft rotatable on a base, and at least two symmetrical frames, each frame being pivoted on pairs of pins disposed on said discs in diametrically opposed positions, said frames being adapted to carry said structures vertically and comprising means actuated to selectively move said structure to and fro in said frame, said vertical shaft being rotated through 180° in both directions to simultaneously transfer said frames carrying said supporting structures from a loading position in which one of said structures is moved from the magazine to a corresponding one frame, to a discharge position adjacent said tool changing device, in which said one structure is moved from the frame to said tool changing station and vice versa, whereby during the working operations of said working machine a new tool supporting structure is loaded into said corresponding frame in said loading position.

2. Machining centre as claimed in claim 1, wherein a plurality of fixed cradles for removably containing said supporting structures are disposed one beside the other in the form of a fan along a circular arc adjacent one side of said working machine and said vertical shaft is disposed with respect to said circular arc in such a manner that the axis of said pins passes through the centre of the said arc when one or the other of said frames is located in said loading position.

3. Machining centre as claimed in claim 2, wherein said frames are locked selectively on said discs during said rotation by means of a locking mechanism mounted on one of said discs and controlled by an element fast with said base, said mechanism comprising a locking part movable on said disc and adapted to connect said disc to said frames and a driving member mounted on said fast element and cooperating with said movable part to release one of said frames in said loading position.

4. Machining centre as claimed in claim 2, wherein said vertical shaft is rotated by a reversible motor meshing with ring gear fast with said shaft.

5. Machining centre as claimed in claim 2, wherein said fixed cradles and said frames respectively comprise sliding guides for said supporting structures, said respective guides being aligned with one another when one of said frames is in said loading position for transferring said supporting structure from said cradle to said frame.

6. Machining centre as claimed in claim 2, wherein each of said frames comprises a drawing mechanism cooperating with said supporting structures for transferring said structures from said cradles to one or the other of said frames when it is in said loading position and for positioning said supporting structures with respect to said tool changing device when one or the other of said frames is in said adjacent position.

7. Machining centre as claimed in claim 6, wherein said mechanism comprises a chain passed around two pulleys rotatable on each one of said frames, said chain bearing a connecting element cooperating selectively with a drawing member fast with each of said supporting structures.

8. Machining centre as claimed in claim 7, wherein said connecting element comprises a pin fixed in overhanging manner on said chain, and said drawing member comprises a block having a groove perpendicular to the direction of movement of said chain and adapted to receive said pin, whereby said pin occupies said groove only when it is moved along a strand of said chain.

9. Machining centre as claimed in claim 7, wherein said drawing member comprises a block device cooperating with one or the other of said frames for connecting said supporting structure securely to said frames after said structure has been transferred to said frames.

10. Machining centre as claimed in claim 9, wherein said block device comprises a slide slidable in said block and moved by said pin, said slide cooperating with a lock fast with one or the other of said frames when said supporting structure is on said frames.

11. Machining centre as claimed in claim 2, wherein said handling device comprises a pull arm connectable selectively to one or the other of said frames in said loading position to rotate one or the other of said frames on said pins from said position along said circular arc into alignment with one of said cradles.

12. Machining centre as claimed in claim 11, wherein said pull arm is fast with a shaft rotatable on said base and coaxial with one of said pins when said discs are in said loading position, said shaft bearing at its front a prismatic element adapted to be inserted in a corresponding groove in said pin to connect said pull arm to said frame.

13. Machining centre as claimed in claim 11, wherein one end of said pull arm which is opposite said shaft is fast with a carriage slidable on a fixed circular guide concentric with said circular arc.

14. Machining centre as claimed in claim 13, wherein said pull arm is rotated by a reversible motor fixed on said arm, said motor rotating a pinion meshing with a ring gear fast with the said circular guide.

15. Machining centre as claimed in claim 13, wherein a first positioning device fast with the said arm is adapted to lock said arm in said predetermined position by means of a locking element inserted by said first device into seats in said circular guide.

16. Machining centre as claimed in claim 2, comprising a third, fixed, frame aligned with one of said first and second frames in said adjacent position for guiding and bearing said supporting structure for the tools during the exchange of said tools in said tool changing device.

17. Machining centre as claimed in claim 15, wherein said third frame comprises a slidable positioning bar provided with a plurality of notches, said bar being prearranged to be connected to said supporting structure to arrest it in predetermined exchange positions with respect to said tool changing device.

18. Machining centre as claimed in claim 16, wherein said third frame comprises a second positioning device provided with a movable stop member adapted to be inserted in one of said notches in correspondence with said exchange positions.

19. Machining center comprising a magazine for a plurality of tools, a working machine supplied with said tools, said tools being stacked on several tool supporting structures removably contained in a plurality of corresponding cradles, said cradles being disposed one beside the other in a form of a fan along a circular arc having a center point, said magazine comprising handling means for exchanging said tools between a loading station located in front of said cradles and a tool changing station located adjacent said working machine, said handling means comprising at least a pair of vertical frames pivoted on pairs of pins secured at diametrically opposed positions on a pair of rotatable discs mounted on a vertical shaft, said pins having a pivoting axis parallel to said shaft and said shaft being so positioned relative to said cradles that said pivoting axis passes through said center point, when either of said frames in positioned in said loading position, and an actuating mechanism selectively connectable with said frame in said loading position, to rotate said frame about said pins in front of said cradles, whereby a selected one structure is loaded from said magazine into said frame and vice versa.

* * * * *